(12) United States Patent
Zhang et al.

(10) Patent No.: US 10,713,091 B2
(45) Date of Patent: Jul. 14, 2020

(54) STREAMING PROGRAM EXECUTION METHOD OF INTELLIGENT TERMINAL

(71) Applicant: CENTRAL SOUTH UNIVERSITY, Hunan (CN)

(72) Inventors: Yaoxue Zhang, Hunan (CN); Letian Yi, Hunan (CN); Jianbin Li, Hunan (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 291 days.

(21) Appl. No.: 15/778,217

(22) PCT Filed: Mar. 29, 2016

(86) PCT No.: PCT/CN2016/077608
§ 371 (c)(1),
(2) Date: May 22, 2018

(87) PCT Pub. No.: WO2017/124637
PCT Pub. Date: Jul. 27, 2017

(65) Prior Publication Data
US 2018/0349193 A1 Dec. 6, 2018

(30) Foreign Application Priority Data
Jan. 20, 2016 (CN) .......................... 2016 1 0036352

(51) Int. Cl.
*G06F 9/50* (2006.01)
*G06F 9/445* (2018.01)
(Continued)

(52) U.S. Cl.
CPC ............ *G06F 9/5016* (2013.01); *G06F 8/654* (2018.02); *G06F 9/44521* (2013.01); *G06F 9/4843* (2013.01)

(58) Field of Classification Search
CPC .................................................... G06F 9/5016
See application file for complete search history.

(56) References Cited

U.S. PATENT DOCUMENTS 1,007,501 A * 10/1911 Stellard ................ B67D 3/0009
222/131
2015/0215384 A1* 7/2015 Bannai ................ H04L 41/0813
709/201

(Continued)

FOREIGN PATENT DOCUMENTS

| CN | 101604257 | 12/2009 |
|----|-----------|---------|
| CN | 103793257 | 5/2014 |
| CN | 104158886 | 11/2014 |

OTHER PUBLICATIONS

"International Search Report (Form PCT/ISA/210)", dated Oct. 28, 2016, with English translation thereof, pp. 1-4.

Primary Examiner — Charlie Sun
(74) Attorney, Agent, or Firm — JCIPRNET (57) ABSTRACT

A streaming program execution method of an intelligent terminal is provided. The intelligent terminal does not store a program package of a program before the program is executed. The program package of the program includes a code segment, a read-only data segment, an uninitialized data segment, and a readable/writable data segment and is stored and managed by a server. The intelligent terminal obtains a program execution instruction, downloads the uninitialized data segment, the readable/writable data segment and the code segment of the program package from the server, loads the same into a local storage space and starts the execution of the program. During the execution process, according to a call request of the program on data of the code segment and the read-only data segment, the intelligent (Continued)

terminal downloads the requested data from the server and loads the data into the local storage space for the call of the program.

17 Claims, 5 Drawing Sheets

(51) Int. Cl.
 *G06F 8/654* (2018.01)
 *G06F 9/48* (2006.01)

(56) References Cited

U.S. PATENT DOCUMENTS

2015/0288702 A1\* 10/2015 Choe ................. G06F 21/12
 726/1
2016/0224321 A1\* 8/2016 Seshadri ................. G06F 8/61
2018/0349193 A1\* 12/2018 Zhang ................. G06F 9/44521

\* cited by examiner

| Physical address | File code | File offset |
|---|---|---|
| 100 | 0x21231 | 200 |
| 101 | 0x21231 | 201 |
| 102 | 0x21231 | 202 |

Fig. 7

STREAMING PROGRAM EXECUTION METHOD OF INTELLIGENT TERMINAL

CROSS-REFERENCE TO RELATED APPLICATION

This application is a 371 of international application of PCT application serial no. PCT/CN2016/077608, filed on Mar. 29, 2016, which claims the priority benefit of China application no. 201610036352.1, filed on Jan. 20, 2016. The entirety of each of the abovementioned patent applications is hereby incorporated by reference herein and made a part of this specification.

FIELD OF THE INVENTION

The present invention relates to the field of software execution, and in particular to a streaming program execution method of an intelligent terminal.

DESCRIPTION OF RELATED ART

With the continuous development of technology, intelligent terminals continue to evolve from handheld devices to universal wearable devices. The intelligent terminal usually includes one or more low power consumption CPU/MCU (Central Processing Unit/Micro control Unit), a memory and a peripheral device. The CPU/MCU is firmware and software that are primarily responsible for running an operating system or a device. The intelligent terminal is usually equipped with a flash memory of several kilobytes or several megabytes, and a memory (RAM) of several kilobytes. In general, variables of a running operating system or application program must be stored in the memory (RAM, Random Access Memory), resource data such as pictures and fonts and the like are usually stored in the flash memory to reduce the dependence of the operating system or the application program on the memory.

The user realizes the application of a certain function of the intelligent terminal by loading the operating system or the application program on the intelligent terminal. In order to realize the application functions of the intelligent terminal more effectively, the user often needs to install many different application programs on the intelligent terminal and also needs to update the operating system and the application programs from time to time. In the prior art, the operating system of the intelligent terminal is often stored in the flash memory in the form of firmware. To upgrade the operating system, it is often necessary to download the entire operating system upgrade package and erase the data contents in the entire flash memory through a third-party program module, and then the new operating system upgrade package is written into the flash memory, such as the over-the-air technology (OTA, Over-the-Air Technology) in the prior art. Although the user can obtain more services on the intelligent terminal by upgrading the entire system and the application programs, the upgrade process may take a very long time and a stable network.

A large number of application programs are stored on the intelligent terminal, having very high requirements on the storage space of the intelligent terminal. With the operation of the application programs, the storage space required on the intelligent terminal will further increase, resulting in that the intelligent terminal is more bloated. Moreover, as the functions of the operating system and the application programs become more and more comprehensive, the operating system and the application programs become larger and larger, and increasingly high requirements are proposed for the hardware devices of the intelligent terminal, and the demand for the memory space of the intelligent terminal is particularly prominent. Therefore, it has remarkable significance to provide a method that can not only effectively improve the extensibility of the intelligent terminal, and conveniently obtain new operating systems and application programs, but also can reduce the requirements of the application programs for the hardware of the intelligent terminal and realize the effective execution of the application programs in the intelligent terminal.

BRIEF SUMMARY OF THE INVENTION

The technical problem to be solved by the present invention lies in: in view of the technical problems existing in the prior art, the present invention provides a method that can not only effectively improve the extensibility of an intelligent terminal, and conveniently obtain new operating systems and application programs, but also can reduce the requirements of the application programs for the hardware of the intelligent terminal and realize the effective execution of the application programs in the intelligent terminal.

In order to solve the above technical problems, the technical solution proposed by the present invention is as follows: a streaming program execution method of an intelligent terminal, wherein the intelligent terminal does not store a program package of a program before the program is executed; the program package of the program is stored and managed by a server, according to the ELF file standard, the program package includes a code segment (.code segment), a read-only data segment (.constdata segment), an uninitialized data segment (.bss segment), and a readable/writable data segment (.data section); and the intelligent terminal obtains a program execution instruction, and downloads the uninitialized data segment, the readable/writable data segment and the code segment of the program package from the server, loads the same into a local storage space and starts the execution of the program, during the execution process, according to a call request of the program on the data of the code segment and the read-only data segment, the intelligent terminal downloads the requested data of the code segment and the read-only data segment from the server and loads the data into the local storage space for the call of the program.

As a further improvement of the present invention, the uninitialized data segment and the readable/writable data segment are downloaded from the server and are loaded into the flash memory of the intelligent terminal; and the code segment and the read-only data segment are downloaded from the server and are loaded into the flash memory of the intelligent terminal.

As a further improvement of the present invention, the code segment, the read-only data segment, the uninitialized data segment and the readable/writable data segment of the program package are downloaded from the server and are loaded into the memory of the intelligent terminal.

As a further improvement of the present invention, before the intelligent terminal downloads an executable file from the server, the method further includes comprises the following step: allocating, by the intelligent terminal, a local storage space to the program, when the idle local storage space of the intelligent terminal is smaller than the storage space necessary for the execution of the program, terminating the execution of the program, releasing resources occupied by the program, and otherwise, allocating, by the intelligent terminal, the local storage space to the program.

As a further improvement of the present invention, before the execution of the program is started, the intelligent terminal only downloads the uninitialized data segment and the readable/writable data segment of the executable file, and downloads a first part of the code segment from the server according to a preset blocking method.

As a further improvement of the present invention, when the program proposes the call request for the data of the code segment and the read-only data segment, the method includes: judging whether the requested data are stored in the local storage space, if so, directly providing the data in the local storage space for the call of the program, and otherwise, downloading, by the intelligent terminal, the requested data from the server, and loading the same into the local storage space for the call of the program.

As a further improvement of the present invention, the loading, by the intelligent terminal, the data of the code segment of the executable file into the local storage space further includes a step of re-positioning: modifying, by the intelligent terminal, a relative address in a code segment system unit into an absolute address according to the absolute addresses of a code segment function unit, an uninitialized data segment memory unit, and a readable/writable data segment memory unit.

As a further improvement of the present invention, the intelligent terminal judges whether the data requested by the program are stored in the local storage space according to a mapping metadata table.

As a further improvement of the present invention, the mapping metadata table includes a physical address, a file code and a file offset; and each piece of data of the mapping metadata table corresponds to a piece of data of the local storage space.

As a further improvement of the present invention, the intelligent terminal manages the data downloaded to the server through a transmission list; the intelligent terminal judges whether the data requested for downloading from the server are recorded in the transmission list, if so, the intelligent terminal does not provide a downloading request for the server and waits for the data downloading, otherwise, the intelligent terminal provides the data downloading application for the server, adds the data to the transmission list and downloads the data from the server.

Compared with the prior art, the present invention has the advantages that the present invention can effectively improve the extensibility of the intelligent terminal, and conveniently obtain new operating systems and application programs, but also can reduce the requirements of the application programs for the hardware of the intelligent terminal, particularly the demands of the application programs for the flash memory space and the memory space, and can realize the effective execution of the application programs in the intelligent terminal with a smaller flash memory space and a smaller memory space.

DETAILED DESCRIPTION OF THE INVENTION

The present invention will be further described below with reference to the drawings of the specification and specific preferred embodiments, but the protection scope of the present invention is not limited thereto.

The present embodiment provides a streaming program execution method of an intelligent terminal, wherein the intelligent terminal does not store a program package of a program before the program is executed; the program package of the program is stored and managed by a server, according to the ELF file standard, the program package includes a code segment (.code segment), a read-only data segment (.constdata segment), an uninitialized data segment (.bss segment), and a readable/writable data segment (.data section); and the intelligent terminal obtains a program execution instruction, and downloads the uninitialized data segment, the readable/writable data segment and the code segment of the program package from the server, loads the same into a local storage space and starts the execution of the program, during the execution process, according to a call request of the program on the data of the code segment and the read-only data segment, the intelligent terminal downloads the requested data of the code segment and the read-only data segment from the server and loads the data into the local storage space for the call of the program. In the present embodiment, the need of operating an operating system on the intelligent terminal is treated as the program.

Figure 1:
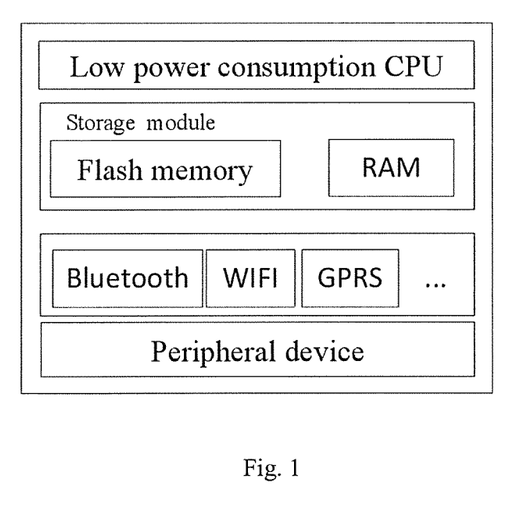
FIG. 1 is a schematic diagram of a hardware structure of an intelligent terminal in an embodiment of the present invention.

In the present embodiment, the hardware structure of the intelligent terminal is as shown in FIG. 1, including a low-power CPU, a storage module, a communication module and a peripheral device, the storage module includes a flash memory and a memory, the communication module includes a Bluetooth module, a WiFi (wireless transmission) module, a GPRS (General Packet Radio Service) module and the like, one or more communication modules may be provided, the peripheral device includes, but not limited to, a GPS (Global Positioning System) positioning device, a gyroscope, a gravity sensing device and the like, and one or more peripheral devices may be provided. The intelligent terminal includes, but not limited to, smart portable devices or smart wearable devices such as smart watches, smart wristbands and the like.

Figure 2:
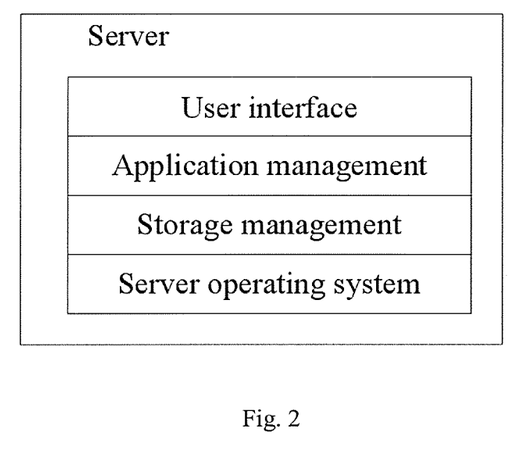
FIG. 2 is a schematic diagram of software deployment of a server in an embodiment of the present invention.

In the present embodiment, the server stores the program package of the program needing to be operated by the intelligent terminal. The software deployment structure of the server is as shown in FIG. 2, including a server operating system, storage management, application management and a user interface. The server operating system may be a universal operating system, such as a Windows operating system, a Linux operating system or the like, or an Android operating system or an iOS operating system running on a handheld device. The storage management is responsible for managing data stored locally on the server. The application management is responsible for managing application programs running on the intelligent terminal. The user interface is responsible for processing the interaction between the user and the server. The server can be a server, a PC, a portable computer, a tablet computer or a smartphone, etc.

Figure 3:
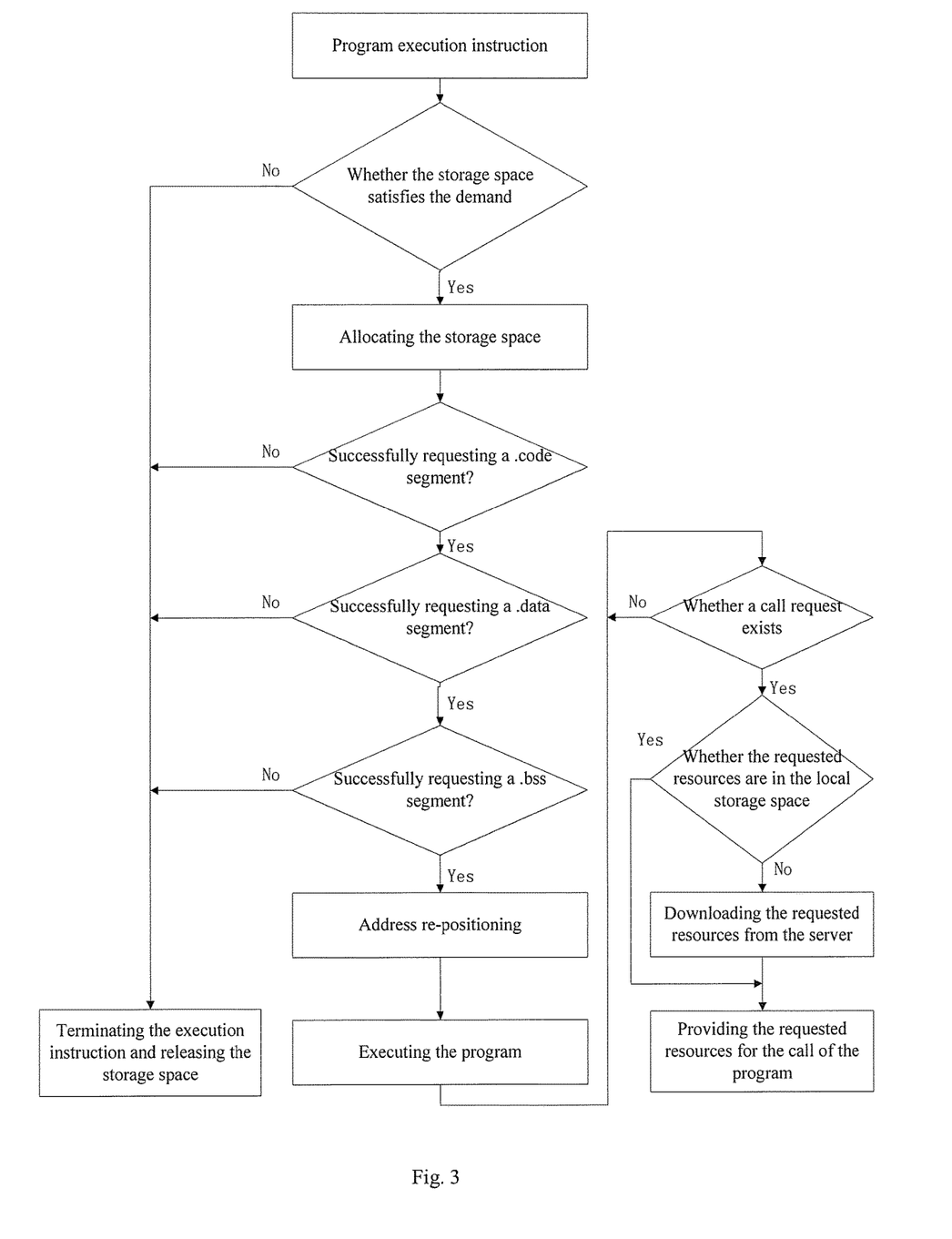
FIG. 3 is a flow schematic diagram in an embodiment of the present invention.

In the present embodiment, the streaming execution process of the program of the present invention is specifically described by taking "program A" as an example. As shown in FIG. 3, the user selects the to-be-started "program A" and sends a "program A" execution instruction to the operating system of the intelligent terminal, the user can select the to-be-started "program A" on the user operating interface of the intelligent terminal to send the execution instruction, can also select the to-be-started "program A" on the server and send the execution instruction to the intelligent terminal via the network.

Figure 5:
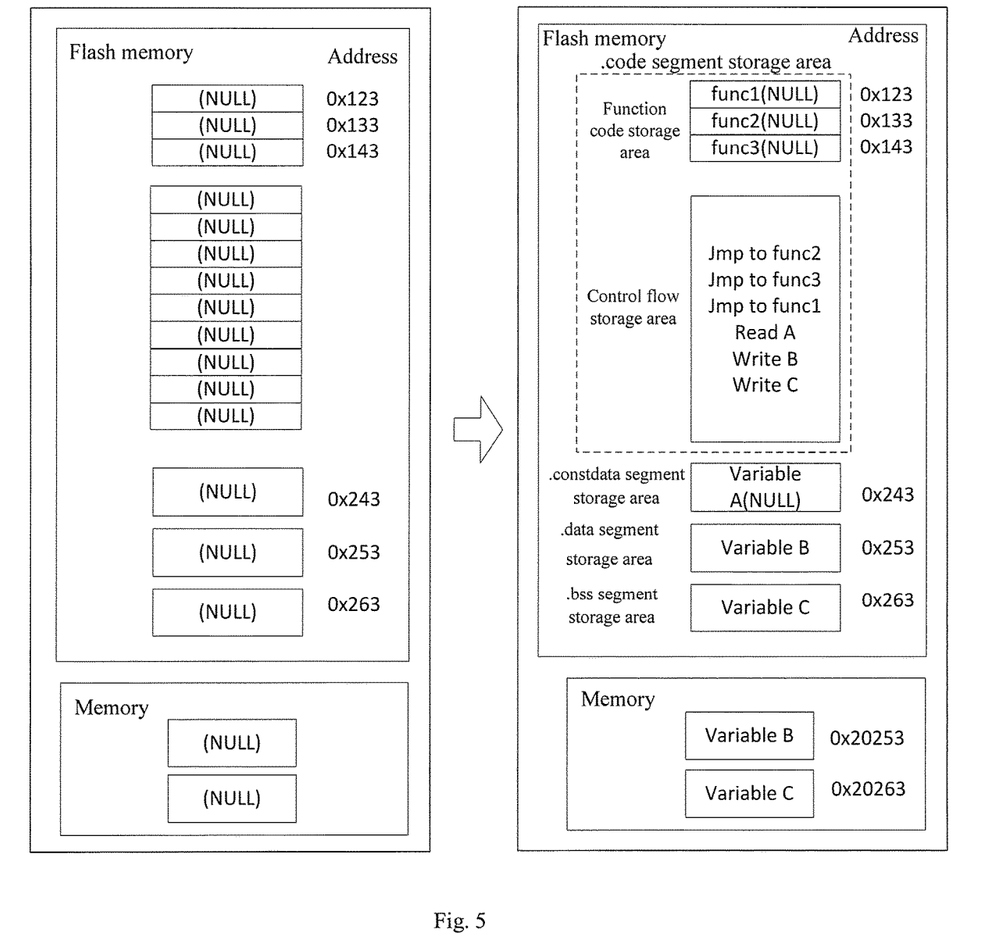
FIG. 5 is a schematic diagram of storage space division and storage in an embodiment of the present invention.

The intelligent terminal obtains the execution instruction of the "program A" and estimates the size of the required storage space for the "program A". When the size of the idle storage space of the intelligent terminal is smaller than the size of the estimated size of the storage space, the execution of the program is terminated and the resources occupied by the program are released, and otherwise the intelligent terminal allocates the local storage space to the program. The storage space includes a storage space of a flash memory and a storage space in the memory. The intelligent terminal allocates a code segment storage area, a read-only data segment storage area, an uninitialized data segment storage area and a readable/writable data segment storage area in the flash memory to the "program A", and allocates the uninitialized data segment storage area and the readable/writable data segment storage area in the memory for respectively storing the uninitialized data segment and the readable/writable data segment of the "program A". The code segment storage area is divided into a function unit and a system unit, which are used for storing a function code and control flow of the code segment respectively. As shown in FIG. 5, the left figure shows the state before the "program A" is loaded into the storage space, and the right figure shows the state after the "program A" is loaded into the storage space. It should be noted that, of course, the uninitialized data segment storage area and the readable/writable data segment storage area may not be allocated in the flash memory, and the uninitialized data segment and the readable/writable data segment downloaded from the server may be directly stored in the uninitialized data segment storage area and the readable/writable data segment storage area allocated by the intelligent terminal in the memory. Alternatively, the storage space is not allocated in the flash memory, and the code segment storage area, the read-only data segment storage area, the uninitialized data segment storage area and the readable/writable data segment storage area are allocated to the "program A" in the memory only. The intelligent terminal directly loads the code segment, the read-only data segment, the uninitialized data segment and the readable/writable data segment downloaded from the server into the memory. Of course, this memory allocation mode requires a large memory space.

In the present embodiment, the intelligent terminal allocates the storage space to the "program A", and downloads a first part of the code segment from the server according to a preset blocking method, as well as the complete uninitialized data segment and the readable/writable data segment. The preset blocking method may be performing blocking according to the code rule of the code segment, for example, according to a function and a process. In the present embodiment, the first part of the code segment is only the entry function part of the "program A". Of course, the first part may also be the first part according to other blocking methods, or even the entire code segment.

Figure 6:
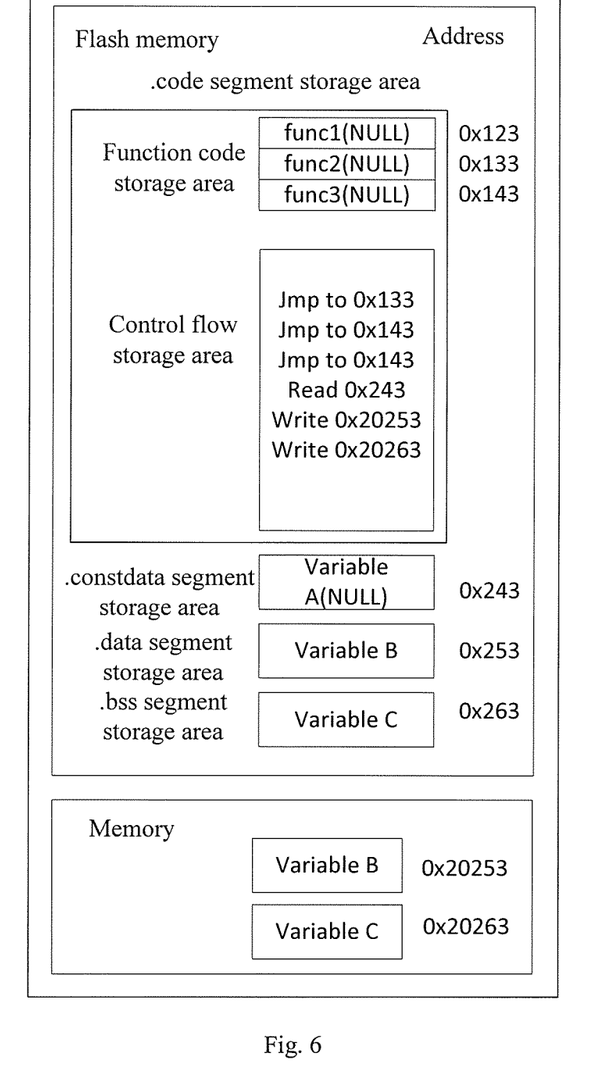
FIG. 6 is a schematic diagram of re-positioning in an embodiment of the present invention.

The intelligent terminal requests the sever to download the complete uninitialized data segment, the readable/writable data segment and the necessary code segment to the server, and loads the same into the local storage space. In the present embodiment, the necessary code segment is the first part of the code segment, if the downloading is unsuccessful, the execution of the "program A" is terminated, and the storage space is released, including transferring the uninitialized data segment and the readable/writable data segment stored in the flash memory into the memory, and the right figure in FIG. 5 shows the storage state after the uninitialized data segment and the readable/writable data segment are transferred into the memory, and the code segment is re-positioned. In the present embodiment, the re-positioning process is: collecting the physical address of the function unit of the code segment storage area, and modifying a relative address of a control flow function in the system unit of the code segment storage area according to the physical address, collecting the physical address of the memory unit of the uninitialized data segment storage area and the readable/writable data segment storage area, and modifying the relative address of a control flow read/write instruction in the system unit of the code segment storage area according to the physical address. As shown in FIG. 5 and FIG. 6, the right figure of FIG. 5 shows the storage state before the re-positioning, the relative address is stored in the system unit of the code segment, FIG. 6 shows the storage state after the re-positioning, the relative address in the system unit of the code segment storage area is modified into the actual physical address according to the actual storage state, namely, an absolute address. After the re-positioning of the code segment is accomplished, the execution of the program is started according to the entry function of the "program A". In the present embodiment, when the program is started, the intelligent terminal only needs to download a part of the data of the program package, and does not need to download the entire program package, thereby greatly shortening the time for the program to wait for downloading. The startup speed is high, and the requirements for the storage spaces of the flash memory and the memory are low.

In the present embodiment, since the intelligent terminal only loads the uninitialized data segment and the readable/writable data segment of the "program A" and the first part of the code segment before the execution of the "program A" is started, during the execution process of the "program A", if the function accessed by the CPU is not loaded into the function segment of the code segment storage area, a data call request of the code segment will be issued, the intelligent terminal downloads the requested code segment from the server, stores the same in the code segment storage area of the flash memory and performs re-positioning for the call of the CPU. If the data of the read-only data segment accessed by the CPU is not loaded into the read-only data segment storage area, a data call request of the read-only data segment will be issued, and the intelligent terminal downloads the requested read-only data segment from the server and stores the same in the read-only data segment storage area of the flash memory for the call of the CPU.

Figure 7:
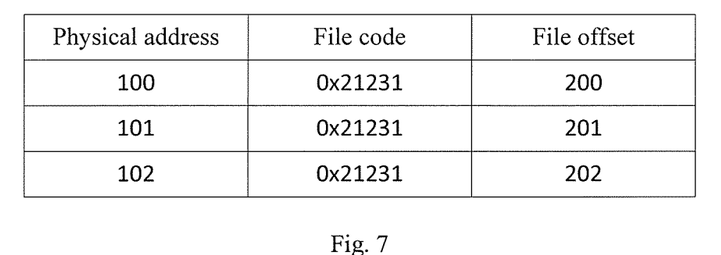
FIG. 7 is a structural schematic diagram of a mapping metadata table in an embodiment of the present invention.

In the present embodiment, as shown in FIG. 7, the intelligent terminal determines whether the data accessed by the CPU are stored in the local flash memory through a mapping metadata table, and the mapping metadata table includes a physical address, a file code and a file offset; the mapping metadata table is sorted according to the physical address of the flash memory, and each piece of data corresponds to a piece of data in the local storage space. When the CPU proposes a data access request, including the file code and the file offset of the file where the requested data are located, whether the requested data are stored in the flash memory can be judged via the mapping metadata table, if so, the data are directly provided for the access of the CPU, and otherwise, downloading is requested from the server through the file code and the file offset. Because the contents in the mapping metadata table need to be stored for a long time, the mapping metadata table is stored in the flash memory, and of course, it can also be stored in the memory and periodically refreshed to the flash memory or the server.

Figure 4:
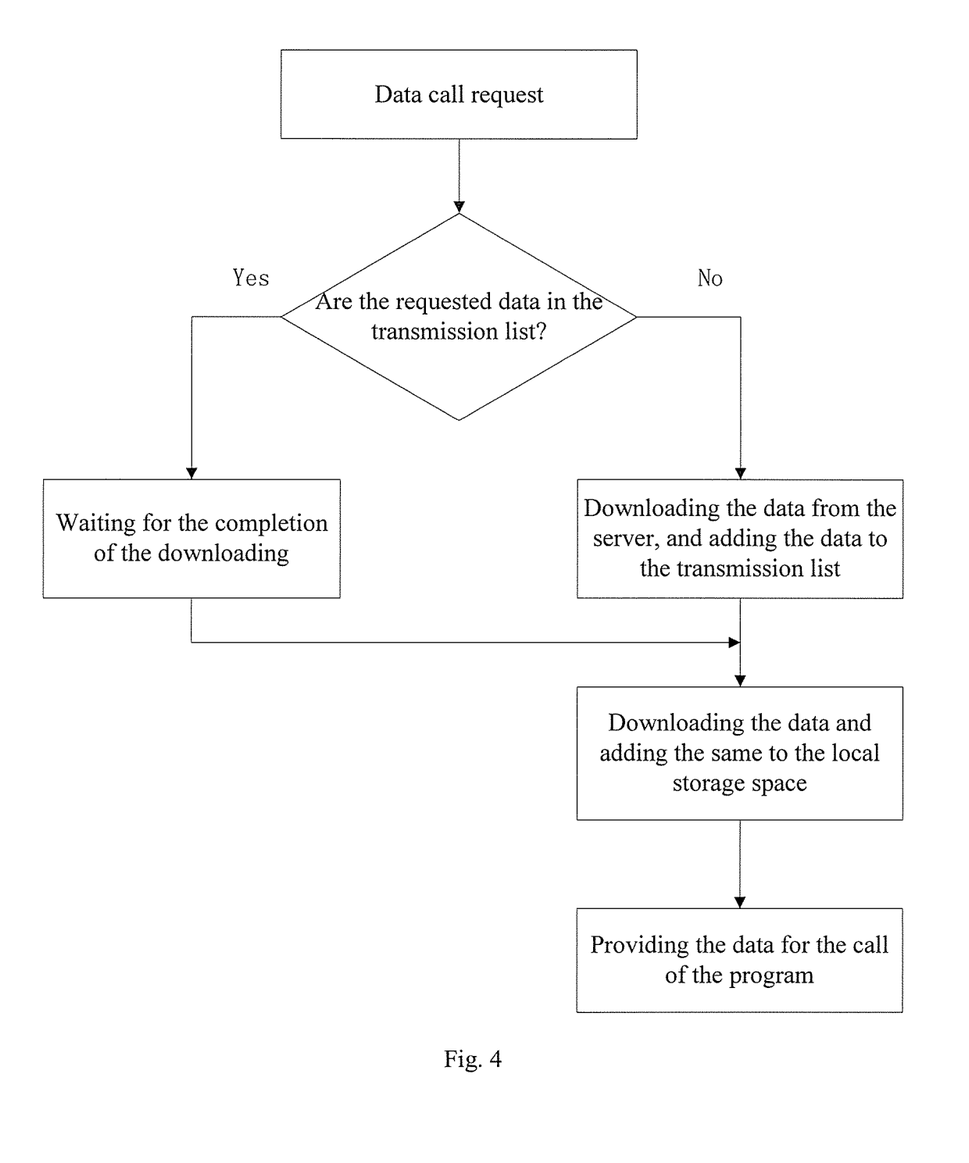
FIG. 4 is a schematic diagram of a data downloading flow in an embodiment of the present invention.

As shown in FIG. 4, in the present embodiment, when the data accessed by the CPU are not in the local flash memory, the intelligent terminal needs to apply for downloading data from the server. The intelligent terminal judges whether the data requested for downloading from the server are recorded in a transmission list, if so, the apply for downloading is no longer submitted to the server and completion of the data downloading is waited, and otherwise, the data downloading request is provided for the server through the file code and the file offset of the accessed data, and the data are added to the transmission list and are downloaded from the server. The intelligent terminal waits for the completion of the data downloading and provides the downloaded data for the access and call of the CPU.

In the present embodiment, after the execution of the program is ended, the intelligent terminal unloads the program and releases the occupied memory space and the flash memory space.

The intelligent terminal of the present invention does not store the application programs, and only needs to load the application programs into the local storage space from the server in a streaming manner according to call demands when needing to run the application programs. By adoption of the method of the present invention, the intelligent terminal can almost unlimitedly use the program resources of the server, thereby greatly improving the extensibility of the intelligent terminal, the intelligent terminal can conveniently obtain new operating systems and application programs, can also reduce the requirements of the application programs for the hardware of the intelligent terminal, particularly the demands of the application programs for the flash memory space and the memory space, and can realize the effective execution of the application programs in the intelligent terminal with a smaller flash memory space and a smaller memory space.

The foregoing description is merely a preferred embodiment of the present invention and does not impose any limitation to the present invention in the form. Although the present invention has been disclosed in the above preferred embodiments, it is not intended to limit the present invention. Therefore, any simple modifications, equivalent changes and modifications made to the above embodiments according to the technical essence of the present invention, without departing from the contents of the technical solutions of the present invention, shall fall within the protection scope of the technical solutions of the present invention.

The invention claimed is:

1. A streaming program execution method of an intelligent terminal, wherein the intelligent terminal does not store a program package of a program before the program is executed, the program package of the program is stored and managed by a server, and according to an ELF file standard, the program package comprises a code segment, a read-only data segment, an uninitialized data segment and a readable/writable data segment, wherein the method comprises:
obtaining, by the intelligent terminal, a program execution instruction, and downloading the uninitialized data segment, the readable/writable data segment and the code segment of the program package from the server;
loading, by the intelligent terminal, the uninitialized data segment, the readable/writable data segment and the code segment of the program package into a local storage space and starting an execution of the program; and
during an execution process of the program, according to a request of a call of the program on data of the code segment and the read-only data segment, downloading, by the intelligent terminal, the requested data of the code segment and the read-only data segment from the server and loading the data into the local storage space for the call of the program.

2. The streaming program execution method of the intelligent terminal of claim 1, wherein the uninitialized data segment and the readable/writable data segment are downloaded from the server and are loaded into a memory of the intelligent terminal; and the code segment and the read-only data segment are downloaded from the server and are loaded into a flash memory of the intelligent terminal.

3. The streaming program execution method of the intelligent terminal of claim 1, wherein the code segment, the read-only data segment, the uninitialized data segment and the readable/writable data segment of the program package are downloaded from the server and are loaded into a memory of the intelligent terminal.

4. The streaming program execution method of the intelligent terminal of claim 2, further comprising:
allocating, by the intelligent terminal, a local storage space to the program before the intelligent terminal downloads an executable file from the server, comprising:
when the idle local storage space of the intelligent terminal is smaller than the storage space necessary for the execution of the program, terminating, by the intelligent terminal, the execution of the program, and releasing resources occupied by the program; and
when the idle local storage space of the intelligent terminal is not smaller than the storage space necessary for the execution of the program, allocating, by the intelligent terminal, the local storage space to the program.

5. The streaming program execution method of the intelligent terminal of claim 4, wherein before the execution of the program is started, the intelligent terminal only downloads the uninitialized data segment and the readable/writable data segment of the executable file, and downloads a first part of the code segment from the server according to a preset blocking method.

6. The streaming program execution method of the intelligent terminal of claim 5, wherein when the program proposes the request of the call for the data of the code segment and the read-only data segment, the method comprises:
judging whether the requested data are stored in the local storage space;
if the requested data are stored in the local storage space, directly providing the data in the local storage space for the call of the program; and
if the requested data are not stored in the local storage space, downloading, by the intelligent terminal, the requested data from the server, and loading the downloaded data into the local storage space for the call of the program.

7. The streaming program execution method of the intelligent terminal of claim 6, wherein the loading, by the intelligent terminal, the data of the code segment of the executable file into the local storage space further comprises a step of re-positioning:

modifying, by the intelligent terminal, a relative address in a code segment system unit into an absolute address according to the absolute addresses of a code segment function unit, an uninitialized data segment memory unit, and a readable/writable data segment memory unit.

8. The streaming program execution method of the intelligent terminal of claim 7, wherein the intelligent terminal judges whether the data requested by the program are stored in the local storage space according to a mapping metadata table.

9. The streaming program execution method of the intelligent terminal of claim 8, wherein the mapping metadata table comprises a physical address, a file code and a file offset; and each piece of data of the mapping metadata table corresponds to a piece of data of the local storage space.

10. The streaming program execution method of the intelligent terminal of claim 9, wherein the intelligent terminal manages the data downloaded to the server through a transmission list, comprising:
    judging, by the intelligent terminal whether the data requested for downloading from the server are recorded in the transmission list, wherein
    if the data requested for downloading from the server are recorded in the transmission list, the intelligent terminal does not provide a downloading request for the server and waits for the data downloading, and
    if the data requested for downloading from the server are not recorded in the transmission list, the intelligent terminal provides a data downloading application for the server, adds the data to the transmission list and downloads the data from the server.

11. The streaming program execution method of the intelligent terminal of claim 3, further comprising:
    allocating, by the intelligent terminal, a local storage space to the program before the intelligent terminal downloads an executable file from the server, comprising:
        when the idle local storage space of the intelligent terminal is smaller than the storage space necessary for the execution of the program, terminating, by the intelligent terminal, the execution of the program, and releasing resources occupied by the program; and
        when the idle local storage space of the intelligent terminal is not smaller than the storage space necessary for the execution of the program, allocating, by the intelligent terminal, the local storage space to the program.

12. The streaming program execution method of the intelligent terminal of claim 11, wherein before the execution of the program is started, the intelligent terminal only downloads the uninitialized data segment and the readable/writable data segment of the executable file, and downloads a first part of the code segment from the server according to a preset blocking method.

13. The streaming program execution method of the intelligent terminal of claim 12, wherein when the program proposes the request of the call for the data of the code segment and the read-only data segment, the method comprises:
    judging whether the requested data are stored in the local storage space;
    if the requested data are stored in the local storage space, directly providing the data in the local storage space for the call of the program; and
    if the requested data are not stored in the local storage space, downloading, by the intelligent terminal, the requested data from the server, and loading the downloaded data into the local storage space for the call of the program.

14. The streaming program execution method of the intelligent terminal of claim 13, wherein the loading, by the intelligent terminal, the data of the code segment of the executable file into the local storage space further comprises a step of re-positioning:
    modifying, by the intelligent terminal, a relative address in a code segment system unit into an absolute address according to the absolute addresses of a code segment function unit, an uninitialized data segment memory unit, and a readable/writable data segment memory unit.

15. The streaming program execution method of the intelligent terminal of claim 14, wherein the intelligent terminal judges whether the data requested by the program are stored in the local storage space according to a mapping metadata table.

16. The streaming program execution method of the intelligent terminal of claim 15, wherein the mapping metadata table comprises a physical address, a file code and a file offset; and each piece of data of the mapping metadata table corresponds to a piece of data of the local storage space.

17. The streaming program execution method of the intelligent terminal of claim 16, wherein the intelligent terminal manages the data downloaded to the server through a transmission list, comprising:
    judging, by the intelligent terminal whether the data requested for downloading from the server are recorded in the transmission list, wherein
    if the data requested for downloading from the server are recorded in the transmission list, the intelligent terminal does not provide a downloading request for the server and waits for the data downloading, and
    if the data requested for downloading from the server are not recorded in the transmission list, the intelligent terminal provides a data downloading application for the server, adds the data to the transmission list and downloads the data from the server.

* * * * *